United States Patent
Folke et al.

(10) Patent No.: US 9,380,590 B2
(45) Date of Patent: Jun. 28, 2016

(54) METHOD AND APPARATUS FOR HANDLING THE TDD TAIL PROBLEM FOR AN ABS PATTERN

(75) Inventors: Mats Folke, Luleå (SE); Sara Landström, Luleå (SE)

(73) Assignee: Telefonaktiebolaget L M Ericsson, Stockholm (SE)

(*) Notice: Subject to any disclaimer, the term of this patent is extended or adjusted under 35 U.S.C. 154(b) by 114 days.

(21) Appl. No.: 14/354,148

(22) PCT Filed: Oct. 27, 2011

(86) PCT No.: PCT/SE2011/051277
§ 371 (c)(1),
(2), (4) Date: Apr. 25, 2014

(87) PCT Pub. No.: WO2013/062456
PCT Pub. Date: May 2, 2013

(65) Prior Publication Data
US 2014/0269457 A1    Sep. 18, 2014

(51) Int. Cl.
*H04L 5/14* (2006.01)
*H04W 72/08* (2009.01)
*H04B 7/26* (2006.01)
*H04W 72/12* (2009.01)
(Continued)

(52) U.S. Cl.
CPC ............ *H04W 72/082* (2013.01); *H04B 7/2656* (2013.01); *H04L 1/1893* (2013.01); *H04W 72/1226* (2013.01); *H04L 1/0003* (2013.01); *H04L 1/0009* (2013.01); *H04L 1/0025* (2013.01)

(58) Field of Classification Search
CPC ............ H04W 72/082; H04W 72/1226; H04B 7/2656; H04L 1/0003; H04L 1/0009; H04L 1/0025

USPC .......................... 370/321, 294, 280, 442, 458
See application file for complete search history.

(56) References Cited

U.S. PATENT DOCUMENTS

2011/0310830 A1* 12/2011 Wu .................... H04W 72/1289
370/329

OTHER PUBLICATIONS

Third Generation Partnership Project, "3GPP TS 36.331 V10.3.0 (Sep. 2011)," 3rd Generation Partnership Project; Technical Specification Group Radio Access Network; Evolved Universal Terrestrial Radio Access (E-UTRA); Radio Resource Control (RRC); Protocol specification (Release 10). Sep. 2011. pp. 1-296.

(Continued)

*Primary Examiner* — Brenda H Pham
(74) *Attorney, Agent, or Firm* — Patents on Demand, P.A.; Brian K. Buchheit; Scott M. Garrett (57) ABSTRACT

An interference problem for UE retransmissions at the end of a Sequence Frame Number pattern, in a system wherein a macro base station (12) employs Almost Blank Subframes (ABS) to avoid interference with a micro base station (16), is avoided by first recognizing that an ABS pattern will reset at the end of a SFN period. In some embodiments, in response to this recognition, the micro base station (16) may command (108) a UE to alter a transmission to the micro base station (12), to improve the probability of accurate reception—such as by increasing its transmit power during the relevant time slots, or utilizing a more robust data correction encoding scheme. In other embodiments, in response to recognizing the change in the ABS pattern, the macro base station (12) may schedule (208) other UE to a PRB where they cause lower interference, or may avoid scheduling macro cell UEs in the same time slot.

17 Claims, 5 Drawing Sheets

(51) Int. Cl.
*H04L 1/18* (2006.01)
*H04L 1/00* (2006.01)

(56) References Cited

OTHER PUBLICATIONS

Author Unknown, "Addressing the Tail Problem with ABS Patterns for TDD Configurations 0 & 6," Nokia Siemens Networks, Nokia. 3GPP TSG RAN WG1 #64 Meeting; R1-111013; Feb. 21-25, 2011. pp. 1-3. Taipei, Taiwan.

Author Unknown, "Discussion on Remaining ABS-Related Issues in eICIC for TDD-LTE," New Postcom. 3GPP TSG RAN WG1 Meeting #64; R1-110944; Feb. 21-25, 2011. pp. 1-2. Taipei, Taiwan.

Unknown, Author, "Impact of the TDD Tail Problem", 3GPP TSG RAN WG2 Meeting #73, R2-111261, CATT, Taipei, Feb. 21-25, 2011, pp. 1-3.

* cited by examiner

METHOD AND APPARATUS FOR HANDLING THE TDD TAIL PROBLEM FOR AN ABS PATTERN

TECHNICAL FIELD

The present invention relates generally to wireless communication systems, and in particular to a system and method of managing interference in time division duplex mode due to a reset of the Almost Blank Subframe pattern, to improve the reliability of acknowledgements following retransmissions.

BACKGROUND

A recent development in wireless communications is the deployment and use of heterogeneous networks (sometimes called Het-Net), in which different cell sizes cover the same geographic region, using different base stations and downlink power levels. A conventional cell, served by a base station or eNodeB (eNB), is referred to as the macro cell. "Embedded" within the coverage area of the macro cell, one or more smaller cells may serve users within specific locations, such as within a campus, building, arena, or the like. The smaller cells are variously referred to as micro, pico, or femto cells (additionally, relays and/or repeaters may also be deployed within the macro cell). The term "micro" is used herein to refer to all such smaller, embedded cells. The base stations of these micro cells have different physical sizes and antenna arrangements, and transmit at a lower power, than the macro cell eNB, resulting in smaller geographic coverage areas. For example, the output power difference between a macro cell eNB and micro cell base station can be 10-20 dB, or even more. In the uplink, transmission power is, at least in principle, independent of the base station type and depends primarily on the User Equipment (UE) power capability and estimated channel quality to the receiving basestation (although in practice factors such as receiver sensitivity, number of receive antennas, antenna gain, and the like impact the required uplink power).

The goal of heterogeneous networks is to provide high data rates to localized users in micro cells within a macro cell. The higher data rates result from a better radio link due to close physical proximity to the micro cell base station antennas. By offloading users from the macro cell to the micro cells, the remaining UE served by the macro cell can be scheduled more resources, and hence can also achieve higher data rates. This yields both higher and more uniform data rates in the system.

Within 3GPP LTE Rel. 9, cell selection is based on the power of the reference, or pilot, symbols as measured by the UEs. Therefore, micro nodes have smaller coverage areas than the macro nodes which typically have a much higher transmit power. In later releases of LTE, e.g., probably release 10 and forward, it will be possible to extend the range of the micro cells by using a cell-specific cell selection offset. By increasing this offset, the micro nodes can serve more users.

However, this means that the control channel interference situation may be difficult. For example, the Physical Downlink Control Channel (PDCCH) from a micro cell base station may be severely interfered by an overlaying macro node. We assume herein that all cells, large and small, use the same frequency (band) and carrier.

LTE Rel. 10 will include functionality for time-domain inter-cell interference coordination (ICIC). This functionality includes a concept called Almost Blank Subframes (ABS), which in this context means that a macro eNB 12 will transmit with reduced power and/or activity on some physical resources during certain pre-determined subframes. This way, the interfered users in the embedded or neighbor micro cell will have some subframes during which the interference is low enough for the micro base station 16 to serve them with acceptable performance.

The subframes with reduced power and/or activity repeat according to a predetermined pattern. The pattern is 40 subframes long (40 ms) for LTE frequency division duplex (FDD). For LTE time division duplex (TDD), the pattern length is 20, 60, or 70 subframes long, depending on UUDL configuration. The pattern repeats for the entire Sequence Frame Number (SFN) period of 10240 subframes. The patterns are constructed in such a way that a protected subframe in the DL corresponds to subsequent Physical Hybrid ARQ Indicator Channel (PHICH) transmission occasions, for example if the DL control transmission is a UL grant.

Due to ABS, interference may vary significantly from subframe to subframe for a UE. The interference may be high in non-ABSs, and low in ABSs. In certain situations, a UE can only be scheduled during ABSs, due to the otherwise excessively high interference on downlink control and data channels. Accordingly, a UE should not include non-ABS subframes in CQI measurements and reports, as the measured interference would be higher than what the UE will actually experience. Measurement Restrictions is a feature to exclude subframes from measurements. The eNB signals to the UE which subframes to include in some measurement, such as CQI. This is specified in 3GPP TS 36.331.

The LTE TDD 10 ms frame comprises two half frames, each 5 ms long. The LTE TDD half-frames are further divided into five subframes, each 1 ms long. These subframes may be allocated to uplink, downlink, or "special" communications. Special frames include pilot signals and a guard period. The balance of uplink and downlink subfields, also known as TDD time slots, may be dynamically altered to meet load conditions. In order to provide for orderly alteration in the allocation of uplink and downlink subfields, LTE TDD defines seven subframe allocation configurations, numbered 0-6.

In the case of LTE TDD configurations 1-5, the ABS pattern has a period of 40 or 20 ms, and in either case, is an integer multiple of the SFN period length of 10240 ms. For LTE TDD configurations 0 and 6, however, the period of the ABS is 70 or 60 ms, leaving either a 20 or 40 ms "tail" of uncompleted ABS pattern at the end of each SFN period. For the subsequent SFN period, the ABS pattern is simply reset, and begins anew. The resulting ABSs at the beginning of the new SFN period are different than those that would result from the continuation/completion of the prior ABS pattern. This can cause significant interference problems on the downlink control channels if a UE uplink transmission, occurring within the tail period, requires multiple HARQ retransmissions.

SUMMARY

According to one or more embodiments described and claimed herein, the ABS tail problem for UE retransmissions is avoided by first recognizing that an ABS pattern will reset at the end of a SFN period. The SFNs are monitored. As the current SFN approaches the end of a predetermined SFN period length, a change in the predetermined ABS pattern in a subsequent SFN period is predicted. In some embodiments, in response to this prediction, a UE may alter a transmission to the macro base station, to improve the probability of accurate reception, by increasing its transmit power during the relevant time slots, or utilizing a more robust data correction encoding scheme. In other embodiments, in response to the prediction of ABS pattern reset, the macro base station may schedule the UE on a PRB having lower interference, or may avoid scheduling macro cell UEs in the same time slot. In one embodiment, only those UEs close to the pico cell based on direction (with respect to the eNB) are precluded from the time slot.

One embodiment relates to a method of communication, performed by a first base station in communication with UE in a wireless communication system operating in TDD mode, in the presence of interference from a second base station employing ABS in a predetermined pattern. A SFN associated with each TDD time slot is monitored. As the current SFN approaches the end of a predetermined SFN period length, the first base station recognizes that the predetermined ABS pattern will change in a subsequent SFN period. It then commands the UE to alter a transmission to the first base station in an allocated TDD time slot to improve the probability of accurate reception at the first base station, in response to recognizing the change in the ABS pattern.

Another embodiment relates to a method of operating a base station in a wireless communication system operating in TDD mode, wherein operation of the base station causes interference in communications between another base station synchronized with the base station and a UE, and wherein the base station employs ABS in a predetermined pattern to reduce the interference. A SFN associated with each TDD time slot in communications between the other base station and the UE is monitored. As the current SFN approaches the end of a predetermined SFN period length, the base station recognizes that the predetermined ABS pattern will change in a subsequent SFN period, which may cause the UE to experience additional interference. It then schedules communications so as to reduce interference in communications between the potentially interfered UE and the other base station, in response to recognizing the change in the ABS pattern.

Still another embodiment relates to base station operable in a wireless communication system operating in TDD mode, wherein operation of another base station causes interference in communications between the base station and a UE, and wherein the other base station employs ABS in a predetermined pattern to reduce the interference. The base station includes one or more antenna and a transceiver configured to receive and transmit wireless communication signals via the antenna. The base station also includes a controller. The controller is configured to control the transceiver; monitor a SFN associated with each TDD time slot; as a current SFN approaches the end of a predetermined SFN period length, recognize that the predetermined ABS pattern will change in a subsequent SFN period; and command the UE to alter a transmission to the base station in an allocated TDD time slot to improve the probability of accurate reception at the base station, in response to recognizing the change in the ABS pattern.

Yet another embodiment relates to a base station operable in a wireless communication system operating in TDD mode, wherein operation of the base station causes interference in communications between another base station and a UE, and wherein the base station is configured to employ ABS in a predetermined pattern to reduce the interference. The base station includes one or more antenna and a transceiver configured to receive and transmit wireless communication signals via the antenna. The base station also includes a controller. The controller is configured to control the transceiver; monitor a SFN associated with each TDD time slot in communications between the other base station and the UE; as a current SFN approaches the end of a predetermined SFN period length, recognize that the predetermined ABS pattern will change in a subsequent SFN period, which may cause additional interference to the UE; and schedule communications so as to reduce interference in communications between the potentially interfered UE and the other base station, in response to recognizing the change in the ABS pattern.

DETAILED DESCRIPTION

Figure 1:
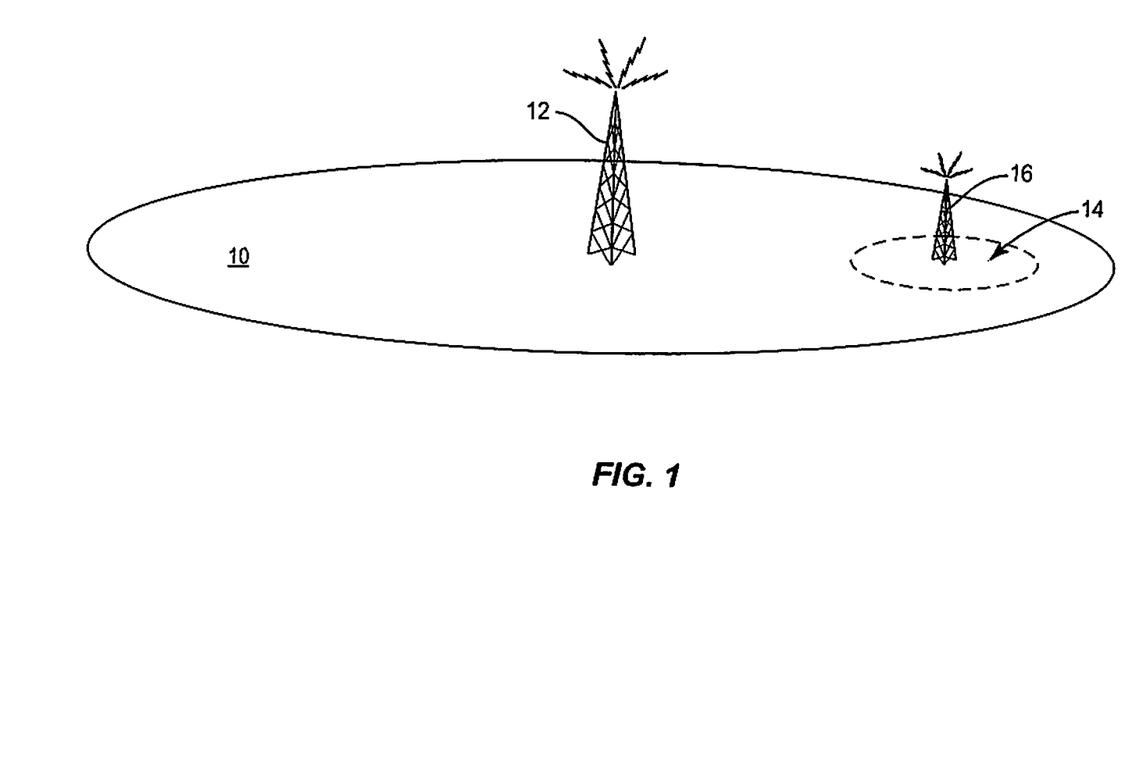
FIG. 1 is a diagram depicting a micro cell operating within a macro cell.
Figure 2:
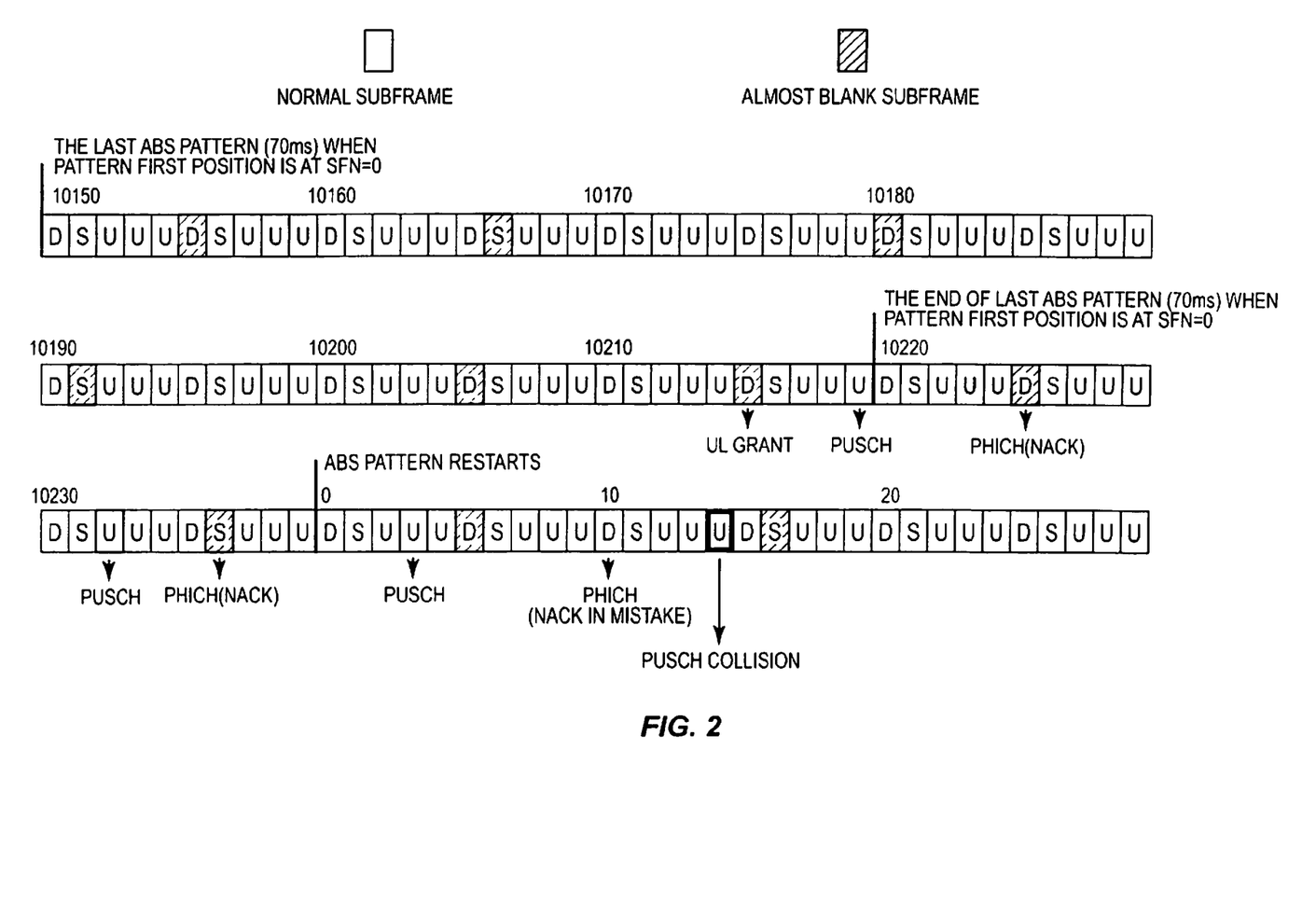
FIG. 2 is a diagram TDD subframes, depicting an ABS pattern reset at the start of a new SFN pattern and UE retransmissions.

FIG. 2 depicts LTE TDD subframes (also known as TDD time slots) and their allocation between downlink (D), uplink (U), and special (S) functions according to LTE TDD subframe allocation configuration 0, with the ABS indicated by shading. When the 70 ms ABS pattern begins at SFN=0, the last full ABS pattern repetition begins at SFN=10150, and ends 70 ms later at SFN=10220. During the (shaded) ABSs, the macro eNB 12 minimizes scheduled activity within the macro cell 10, allowing for communications between UE and the micro cell base station 16. At least one ABS is allocated to each of D, U, and S subframes within the ABS pattern.

The ABS are allocated in consideration of the possibility and timing of HARQ retransmission. When an UL grant is scheduled to a UE, the UE transmits uplink data on the Physical Uplink Shared Channel (PUSCH) at a predetermined subsequent U subframe. The base station acknowledges (i.e., with a positive ACK or negative NACK) on the Physical Hybrid ARQ Indicator Channel (PHICH) at a predetermined subsequent D subframe. In the case of a NACK, the UE will repeat the uplink transmission on PUSCH at a predetermined subsequent U subframe, and the base station will acknowledge the retransmission on PHICH at a predetermined subsequent D subframe. This process may repeat for up to three retransmissions. For a given system configuration and operating mode(s), the relevant U and D subframes for these communications are predetermined and fixed; they are also taken into account in the ABS pattern. During a full (non-truncated) ABS pattern, sufficient ABS are scheduled such that the maximum number of retransmissions may occur, with all acknowledgements falling in ABS, to maximize the probability that the UE correctly receives the ACK/NACK.

In FIG. 2, SFN=10220 marks the beginning of the ABS "tail"—the time at the end of the SFN pattern length (10240) in which only a partial ABS pattern may be implemented, because the ABS pattern length (70 ms) is not an integer multiple of the SFN pattern length (10240 ms). In the case depicted in FIG. 2, the tail is 20 ms (SFN=10220-10240).

FIG. 2 depicts an UL grant being issued to a UE in SFN=10215, and the UE transmitting data to the micro cell base station 16 on the PUSCH in an ABS at SFN=10219. However, for some reason not relevant here, the micro cell base station 16 cannot accurately decode the signal, and it issues a negative acknowledgement (NACK) on the PHICH in SFN=10225. Because this is an ABS, the UE correctly receives the NACK, and retransmits the uplink signal in SFN=10232. However, the micro cell base station 16 still cannot correctly decode the data, and sends another NACK in SFN=10236.

At SFN=10240, the SFN pattern repeats. Since the last ABS pattern has not completed (only 20 ms of the 70 ms pattern completed), the ABS pattern is reset in SFN=0 of the subsequent SFN pattern. The first portion of the (reset) ABS pattern differs from the ABS pattern that would have resulted from continuing the prior one.

In response to the NACK in SFN=10236, the UE again retransmits the uplink data in SFN=3 of the subsequent SFN pattern. The micro cell base station 16 acknowledges (ACK) correct receipt of the data in SFN=10. However, because this subframe is not an ABS (as it would have been had the ABS pattern not been reset at SFN=0), the PHICH experiences significant interference, and the UE erroneously decodes it as a NACK. In response, the UE again retransmits the uplink data in SFN=14, causing a PUSCH collision with other UE, since the UE was not scheduled to perform an UL transmission in SFN=14 (the micro cell base station 16 correctly received the data in SFN=3 and was not anticipating another retransmission). Not only is this retransmission unnecessary, it will cause significant interference with other UE transmissions, possibly necessitating a large number of retransmissions in the system. This is, of course, only one of many possible scenarios in which the reset of the ABS pattern could result in increased interference and erroneous reception. It is important to remember that the occasions where the UE and micro cell base station 16 send data are all predetermined. It is not possible for micro cell base station 16 to send the PHICH of SFN=10 at another time for example.

A simple solution to this problem would be to not issue an UL grant to the UE in SFN=10215, in anticipation of the need for retransmission and knowing the system is entering the tail of SFN, where the ABS pattern will reset. However, this requires a delay of at least the entire 20 ms tail, and could degrade the perceived user experience if the UE is running a delay-sensitive service, such as voice communications. Further, since the problem is presented every 10.24 seconds, such a delay would be recurring. It can also be difficult to predict which transmissions may fail.

According to embodiments of the present invention, the interference problem is solved by first, monitoring the SFN pattern and recognizing the ABS tail pattern and how it may impact UL retransmissions. Second, the UE may be commanded to alter its transmission(s) to increase the probability of proper reception, and/or the macro cell eNB 12 may reduce interference to increase the probability of proper reception. In either case, the action is taken in response to a recognition that the ABS pattern will change.

Figure 3:
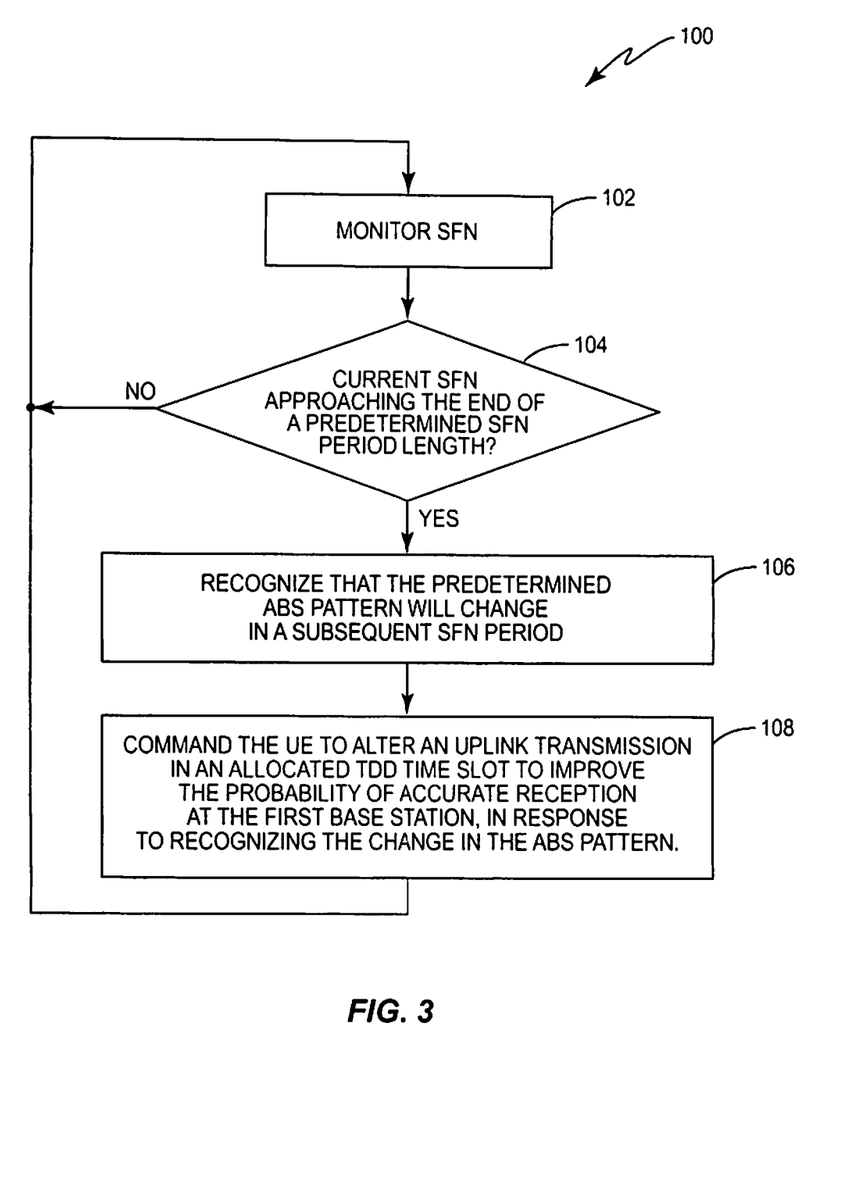
FIG. 3 is a flow diagram of a method of communication by a micro base station in the presence of interference due to an ABS pattern reset.

FIG. 3 depicts a method 100, performed by a micro cell base station 16 operating in TDD mode, in the presence of interference from macro cell eNB 12 employing ABS in a predetermined pattern. The micro cell base station 16 monitors the current SFN (block 102). As the current SFN approaches the end of a predetermined SFN period length (block 104), the micro cell base station 16 recognizes that the predetermined ABS pattern will change, beginning with the start of a subsequent SFN period (block 106). In this case, the micro cell base station 16 commands the UE to alter an UL transmission in a subframe allocated to UL to improve the probability of accurate reception by the micro cell base station 16, in response to recognizing the change in the ABS pattern (block 108). In one embodiment, the UE is commanded to alter the UL transmission by increasing its transmit power for retransmission when approaching the last retransmission opportunity within the current ABS pattern. In one embodiment, the transmit power may be increased automatically, based on the SFN. In other embodiments, known power control methods, such as power control commands, can be used to boost the UE transmit power.

In another embodiment, the UE is commanded to alter the UL transmission in response to the recognized change in the ABS pattern (block 108) by choosing a more robust Modulation and Coding Scheme (MCS). As used herein, a more robust MCS is one that increases the error protection coding, at the cost of a lower data rate. This increases the probability that error correction decoding at the micro cell base station 16 will be able to recover the data.

Figure 4:
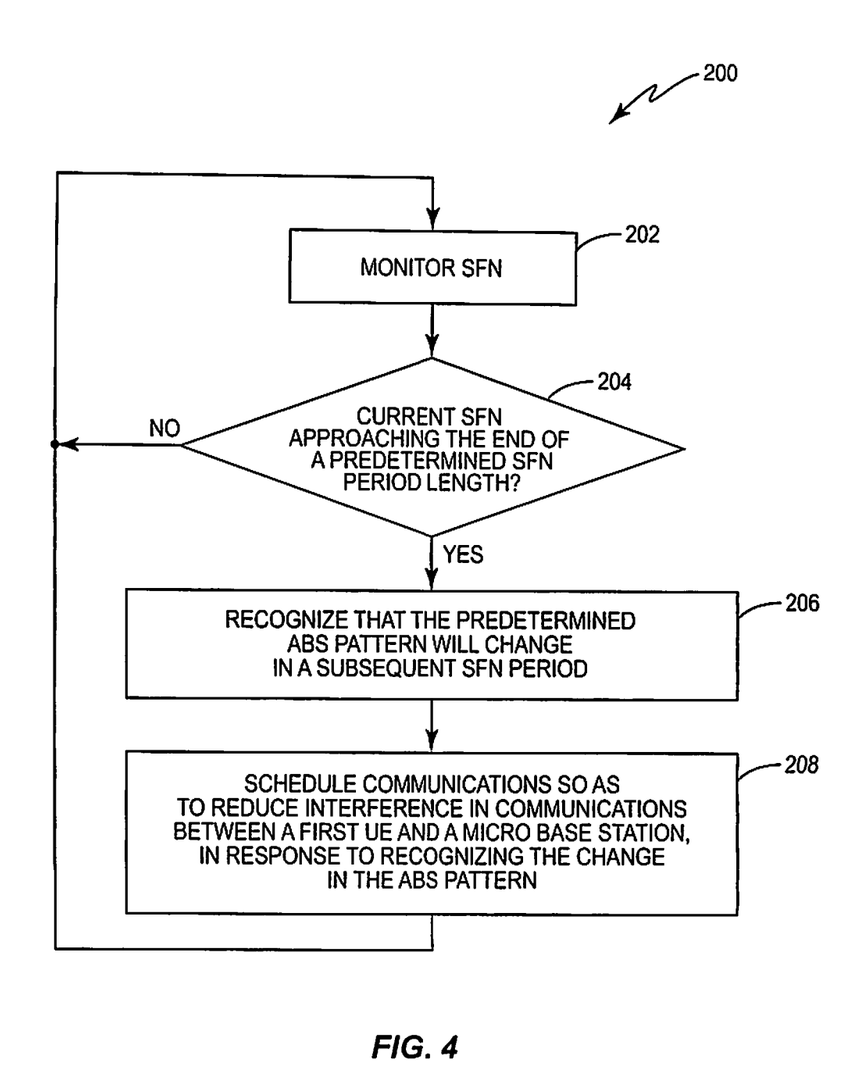
FIG. 4 is a flow diagram of a method of scheduling communications in the presence of interference due to an ABS pattern reset.

FIG. 4 depicts a method 200, performed by the macro cell eNB 12 operating in TDD mode and employing ABS in a predetermined pattern, wherein operation of the eNB 12 causes interference in communications between a UE and the micro cell base station 16. The eNB 12 monitors the current SFN (block 202). As the current SFN approaches the end of a predetermined SFN period length (block 204), the eNB 12 recognizes that the predetermined ABS pattern will change, beginning with the start of a subsequent SFN period (block 206). In this case, the macro cell eNB 12 schedules communications so as to reduce interference in communications between the UE and the micro cell base station 16, in response to recognizing the change in the ABS pattern (block 108).

In one embodiment, the macro cell eNB 12 schedules the UE to a Physical Resource Block (PRB) with lower interference. In LTE Rel. 8, Inter-Cell Interference Coordination (ICIC) was introduced for the data channels. There are two messages—Overload Indicator (OI) and High Interference Indicator (HII)—which are event-triggered and can be used to improve the channel conditions by avoiding strong interference for the last retransmission-PHICH slot before the ABS pattern is reset. These messages are sent between base stations over an X2 interface. OI is sent indicating low, medium, or high interference levels. HII makes it possible to indicate PRBs and PRBs where the serving cell intends to schedule cell-edge users and thus create a high interference. In one embodiment, given information from surrounding cells regarding which PRBs that are likely to experience high interference, the eNB 12 can allocate UL retransmissions to PRBs with lower interference.

In one embodiment, the eNB 12 schedules communications so as to reduce interference in communications between the UE and the micro cell base station 16, in response to recognizing the change in the ABS pattern (block 108), by not scheduling UL transmissions from other UEs on the PRBs where retransmissions in the micro cell 14 are anticipated in the subframes in question (e.g., SFN=10219 and SFN=10232 in FIG. 2). This improves the probability of accurate reception by the micro cell base station 16, reducing the probability that a NACK and subsequent retransmission will be necessary.

In one embodiment, the eNB 12 may still balance scheduling over the entire macro cell 10, but abstaining from scheduling (as described above) only those UE in the same direction, with respect to the eNB 12, as the UE attempting retransmission to the micro cell base station 16. The direction of each requesting UE may be determined using known techniques, such as Angle of Arrival (AoA). This applies both to DL scheduling in SFN=10 in the example, and UL scheduling in SFN=10219, 10232, and 3.

Figure 5:
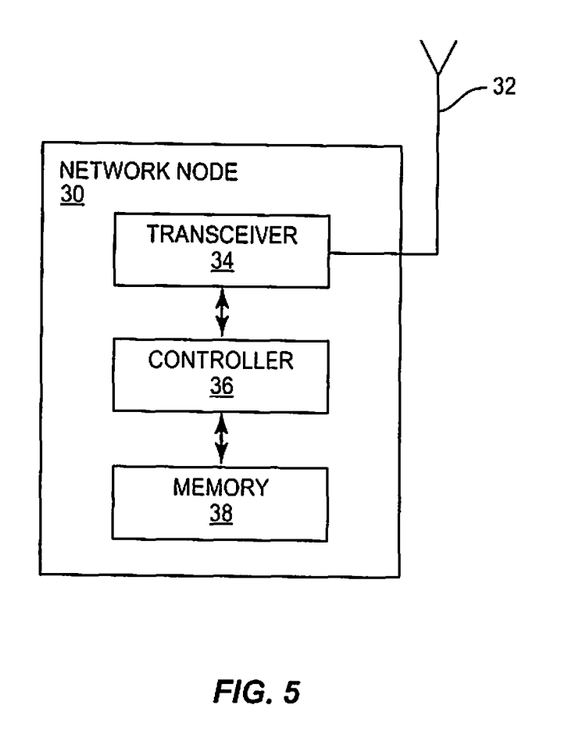
FIG. 5 is a functional block diagram of a network node operative to command a UE to alter transmissions, or to reduce interference, to overcome interference due to an ABS pattern reset.

FIG. 5 depicts a wireless communication network node 30, which may comprise a micro cell eNB 16 or a macro cell eNB 12. The node transmits and receives data and control information across an air interface, according to known protocols such as 3GPP LTE, via one or more antenna 32, which are operatively connected to a transceiver 34. The transceiver is operative to receive and transmit signals as determined by a controller 36. The controller 36, which may for example comprise a state machine, programmable processor or Digital Signal Processor (DSP), operates in accordance with instructions stored in a machine readable media, such as memory 38 operatively connected to the controller 36.

In one embodiment, in which the network node 30 is a micro cell base station 16, the controller 36 is operative to control the transceiver 34 to transmit commands to the UE causing the UE to transmit UL data at an increased power level in certain subframes at the end of an SFN pattern, in response to recognizing a change in the ABS pattern in a subsequent SFN pattern. In another embodiment in which the network node 30 is a micro cell base station 16, the controller 36 is operative to command the UE to encode data intended for UL transmission with a more robust MCS (and lower data rate), in response to a recognizing a change in the ABS pattern in a subsequent SFN pattern.

In one embodiment, in which the network node 30 is a macro cell eNB 12 employing ABS for the benefit of one or more micro cell base stations 16, the controller 36 is operative to schedule communications so as to reduce interference in communications between a UE and the micro cell base station 16, in response to recognizing a change in the ABS pattern in a subsequent SFN pattern, by scheduling the UE to a PRB where it will experience lower interference, for the subframes in question. In another embodiment in which the node 30 is a macro cell eNB 12, the controller 36 is operative to schedule communications so as to reduce or eliminate the number of other UE transmitting UL signals in subframes in question, in response to recognizing a change in the ABS pattern in a subsequent SFN pattern. In one embodiment, the controller 36 receives AoA information from the transceiver 34, and is operative to restrict from the subframes in question only UE in the macro cell 10 in the same direction, with respect to the eNB 12, as the UE possibly requiring retransmission in the ABS tail of an SFN period.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of communication, performed by a first base station in communication with User Equipment (UE) in a wireless communication system operating in Time Division Duplex (TDD) mode, in the presence of interference from a second base station that employs Almost Blank Subframes (ABS) in a predetermined pattern, comprising:
   monitoring a Sequence Frame Number (SFN) associated with each TDD time slot;
   as a current SFN approaches the end of a predetermined SFN period length, recognizing that the predetermined ABS pattern will change in a subsequent SFN period; and in response to recognizing the change in the ABS pattern, commanding the UE to alter a transmission to the first base station in an allocated TDD time slot to improve the probability of accurate reception at the first base station, wherein the transmission to be altered to improve the probability of reception is an uplink retransmission transmitted in response to the receipt by the UE from the first base station of a negative acknowledgement and wherein commanding the UE to alter a transmission to the first base station to improve the probability of accurate reception comprises commanding the UE to increase the transmit power for the transmission.

2. The method of claim 1, wherein the transmission to be altered comprises the last retransmission opportunity within the current ABS pattern.

3. The method of claim 1, wherein commanding the UE to increase the transmit power for the transmission comprises provisioning the UE to automatically increase the transmit power in the TDD time slot comprising the last retransmission opportunity within the current ABS pattern, if the transmission is a retransmission.

4. The method of claim 1, wherein commanding the UE to increase the transmit power for the transmission comprises commanding the UE to increase the transmit power by sending power control commands to the UE.

5. The method of claim 1, wherein commanding the UE to alter a transmission to the first base station to improve the probability of accurate reception comprises commanding the UE to increase the robustness of a Modulation and Coding Scheme (MCS) used to encode data intended for the transmission.

6. A method of operating a base station in a wireless communication system in a Time Division Duplex (TDD) mode, wherein the base station employs Almost Blank Subframes (ABS) in a predetermined pattern to reduce interference caused by operation of the base station with respect to communications between a User Equipment (UE) and another base station that is synchronized to the base station, said method comprising:
   monitoring a Sequence Frame Number (SFN) associated with each TDD time slot in communications between the other base station and the UE;
   as a current SFN approaches the end of a predetermined SFN period length, recognizing that the predetermined ABS pattern will change in a subsequent SFN period, which may cause the UE to experience additional interference; and
   in response to recognizing the change in the ABS pattern, scheduling communications so as to reduce interference in communications between the UE and the other base station, wherein scheduling communications so as to reduce interference comprises avoiding scheduling other UE in a TDD time slot allocated to the UE.

7. The method of claim 6, wherein scheduling communications so as to reduce interference comprises scheduling other UE to a Physical Resource Block in which they will cause reduced interference to communications between the UE and the other base station.

8. The method of claim 6, wherein avoiding scheduling other UE in a TDD time slot allocated to the UE comprises avoiding scheduling other UE in the same direction as the UE, with respect to the base station, during the TDD time slot allocated to the UE.

9. A base station configured for operation in a wireless communication system that operates in a Time Division Duplex (TDD) mode and includes another base station that is configured to employ Almost Blank Subframes (ABS) in a predetermined pattern to reduce interference caused by the other base station with respect to communications between the base station and a User Equipment (UE), said base station comprising:
   one or more antennas;

a transceiver configured to receive and transmit wireless communication signals via the one or more antennas; and a controller configured to:

control the transceiver;

monitor a Sequence Frame Number (SFN) associated with each TDD time slot;

as a current SFN approaches the end of a predetermined SFN period length, recognize that the predetermined ABS pattern will change in a subsequent SFN period; and in response to recognizing the change in the ABS pattern, command the UE to alter a transmission to the base station in an allocated TDD time slot to improve the probability of accurate reception at the base station, wherein the controller is operative to command the UE to alter a transmission to improve the probability of accurate reception by commanding the UE to increase the transmit power for the transmission.

10. The base station of claim 9, wherein the transmission to be altered to improve the probability of reception is an uplink retransmission transmitted in response to the receipt by the UE from the base station of a negative acknowledgement.

11. The base station of claim 10, wherein the transmission to be altered comprises the last retransmission opportunity within the current ABS pattern.

12. The base station of claim 9, wherein the controller is operative to command the UE to increase the transmit power for the transmission by provisioning the UE to automatically increase the transmit power in the TDD time slot comprising the last retransmission opportunity within the current ABS pattern, if the transmission is a retransmission.

13. The base station of claim 9, wherein the controller is operative to command the UE to increase the transmit power for the transmission by sending power control commands to the UE.

14. The base station of claim 9, wherein the controller is operative to command the UE to alter a transmission to improve the probability of accurate reception by commanding the UE to increase the robustness of a Modulation and Coding Scheme (MCS) used to encode data intended for the transmission.

15. A base station configured for operation in a wireless communication system operating in Time Division Duplex (TDD) mode and further configured to employ Almost Blank Subframes (ABS) in a predetermined pattern to reduce interference caused by the base station with respect to communications between another base station in the system and a User Equipment (UE), said base station comprising:

one or more antennas;

a transceiver configured to receive and transmit wireless communication signals via the one or more antennas; and a controller configured to:

control the transceiver;

monitor a Sequence Frame Number (SFN) associated with each TDD time slot in communications between the other base station and the UE;

as a current SFN approaches the end of a predetermined SFN period length, recognize that the predetermined ABS pattern will change in a subsequent SFN period, which may cause additional interference to the UE; and in response to recognizing the change in the ABS pattern, schedule communications so as to reduce interference in communications between the UE and the other base station, wherein the controller is operative to schedule communications so as to reduce interference by avoiding scheduling other UE in a TDD time slot allocated to the UE, in response to recognizing the change in the ABS pattern.

16. The base station of claim 15 wherein the controller is operative to schedule communications so as to reduce interference by scheduling other UE to a Physical Resource Block in which they will cause reduced interference to communications between the UE and the other base station, in response to recognizing the change in the ABS pattern.

17. The base station of claim 15, wherein the transceiver is further operative to receive Angle of Arrival information from UEs, and wherein the controller is further operative to avoid scheduling other UE in the same direction as the UE, with respect to the base station, during the TDD time slot allocated to the UE, in response to recognizing the change in the ABS pattern.

* * * * *